(12) United States Patent
Todorovic

(10) Patent No.: US 8,776,946 B2
(45) Date of Patent: Jul. 15, 2014

(54) GAS TURBINE EXHAUST CONE

(75) Inventor: Predrag Todorovic, Berlin (DE)

(73) Assignee: Rolls-Royce Deutschland Ltd & Co KG (DE)

(*) Notice: Subject to any disclaimer, the term of this patent is extended or adjusted under 35 U.S.C. 154(b) by 0 days.

(21) Appl. No.: 13/980,017

(22) PCT Filed: Jan. 19, 2012

(86) PCT No.: PCT/EP2012/000242
§ 371 (c)(1),
(2), (4) Date: Aug. 7, 2013

(87) PCT Pub. No.: WO2012/097997
PCT Pub. Date: Jul. 26, 2012

(65) Prior Publication Data
US 2013/0306403 A1   Nov. 21, 2013

(30) Foreign Application Priority Data

Jan. 19, 2011   (DE) .................. 10 2011 008 921

(51) Int. Cl.
| F02K 1/82 | (2006.01) |
| F02K 1/04 | (2006.01) |
| F02C 7/24 | (2006.01) |
| F01D 25/30 | (2006.01) |
| F02C 5/10 | (2006.01) |
| F02K 1/78 | (2006.01) |
| F02K 1/00 | (2006.01) |

(52) U.S. Cl.
CPC .............. *F02C 7/24* (2013.01); *F05D 2260/96* (2013.01); *F01D 25/30* (2013.01); *F02K 1/827* (2013.01); *F02C 5/10* (2013.01)
USPC ............................ 181/213; 244/1 N; 60/770

(58) Field of Classification Search
USPC ........ 181/292, 213, 210; 244/1 N, 58; 60/770
See application file for complete search history.

(56) References Cited

U.S. PATENT DOCUMENTS

| 2,988,302 A | 6/1961 | Smith |
| 3,721,389 A | 3/1973 | MacKinnon et al. |

(Continued)

FOREIGN PATENT DOCUMENTS

| DE | 2856917 | 7/1980 |
| DE | 69815961 | 1/2004 |

(Continued)

OTHER PUBLICATIONS

International Search Report dated Jul. 18, 2012 for counterpart PCT patent application.

(Continued)

*Primary Examiner* — Edgardo San Martin
(74) *Attorney, Agent, or Firm* — Timothy J. Klima; Shuttleworth & Ingersoll, PLC

(57) ABSTRACT

The present invention relates to a gas-turbine exhaust cone having an outer wall, which is provided with a plurality of recesses, a honeycomb-structured layer, which is arranged on the inside of the outer wall and extends along the inside of the outer wall, an inner wall, which extends substantially parallel to the outer wall and is connected to the honeycomb structure, and at least one annular chamber, which adjoins the inner wall and is centered relative to a central axis, with the inner wall being provided with passage recesses connecting the area of the honeycomb structure to the annular chamber.

12 Claims, 6 Drawing Sheets

(56) References Cited

U.S. PATENT DOCUMENTS

Figure 1:
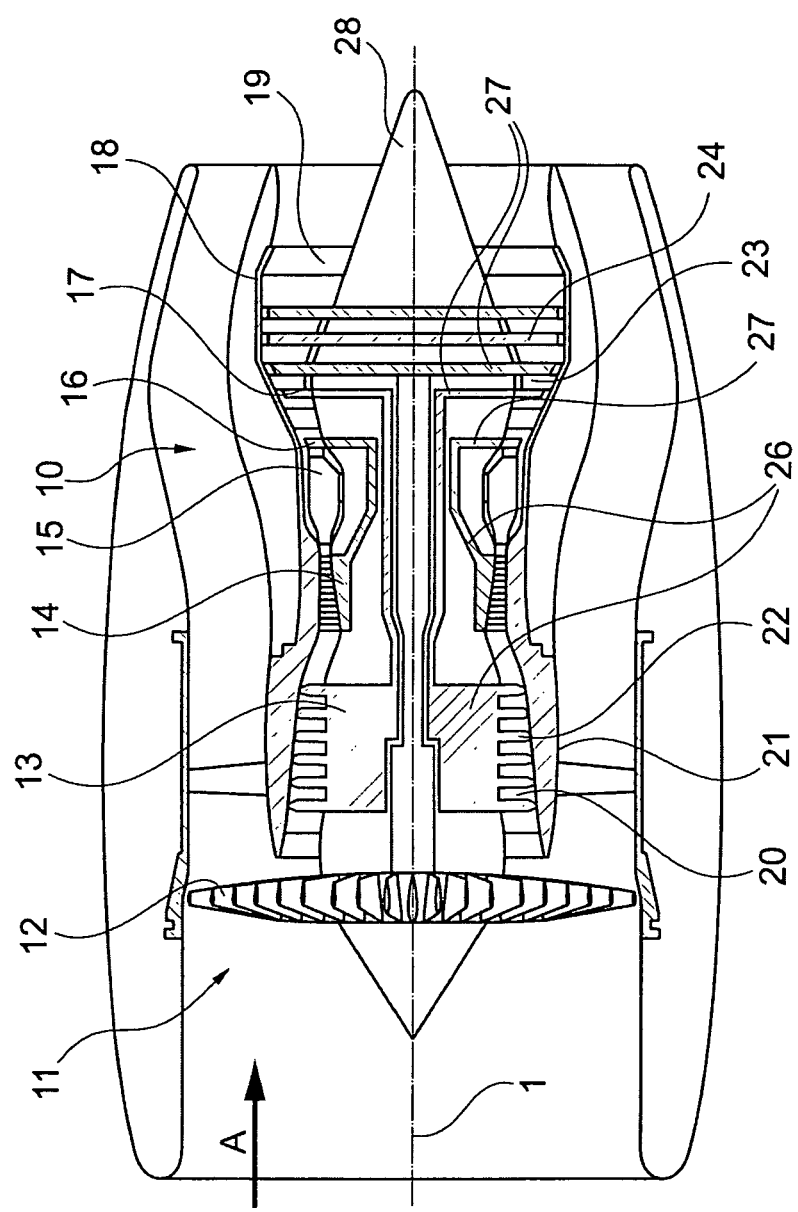

| | | | | |
|---|---|---|---|---|
| 3,850,261 | A * | 11/1974 | Hehmann et al. | 181/286 |
| 4,044,555 | A * | 8/1977 | McLoughlin et al. | 60/264 |
| 4,064,961 | A | 12/1977 | Tseo | |
| 4,100,993 | A * | 7/1978 | Feder | 181/213 |
| 4,137,992 | A | 2/1979 | Herman | |
| 4,150,732 | A * | 4/1979 | Hoch et al. | 181/213 |
| 4,226,297 | A * | 10/1980 | Cicon | 181/213 |
| 4,240,519 | A * | 12/1980 | Wynosky | 181/213 |
| 4,244,441 | A * | 1/1981 | Tolman | 181/213 |
| 4,258,822 | A * | 3/1981 | Streib | 181/213 |
| 5,655,361 | A * | 8/1997 | Kishi | 60/266 |
| 6,615,576 | B2 * | 9/2003 | Sheoran et al. | 60/39.5 |
| 6,935,834 | B2 * | 8/2005 | Lata Perez | 415/115 |
| 7,367,424 | B2 * | 5/2008 | Brown et al. | 181/250 |
| 7,765,784 | B2 * | 8/2010 | Lwasa et al. | 60/39.5 |
| 7,784,283 | B2 * | 8/2010 | Yu et al. | 60/770 |
| 7,891,195 | B2 * | 2/2011 | Bouty et al. | 60/770 |
| 8,025,122 | B2 * | 9/2011 | Gilcreest et al. | 181/213 |
| 8,037,967 | B2 * | 10/2011 | Mercat | 181/292 |
| 8,307,945 | B2 * | 11/2012 | Todorovic | 181/213 |
| 8,479,877 | B2 * | 7/2013 | Todorovic | 181/213 |
| 8,596,568 | B2 * | 12/2013 | Francisco et al. | 244/1 N |
| 2004/0076512 | A1 | 4/2004 | Lata Perez | |
| 2007/0256889 | A1 | 11/2007 | Yu et al. | |
| 2007/0272477 | A1 | 11/2007 | Vincent | |
| 2009/0014234 | A1 | 1/2009 | Bagnall | |
| 2009/0019857 | A1 | 1/2009 | Tisdale et al. | |
| 2010/0012423 | A1 | 1/2010 | Mercat | |
| 2010/0192590 | A1 | 8/2010 | Johnson et al. | |
| 2011/0167785 | A1 | 7/2011 | Moore et al. | |

FOREIGN PATENT DOCUMENTS

| | | |
|---|---|---|
| EP | 0895222 | 2/1999 |
| EP | 1391597 | 2/2004 |

OTHER PUBLICATIONS

German Search Report dated Jan. 11, 2012 for counterpart German patent application.
English translation of International Search Report and Written Opinion from counterpart PCT App No. PCT/EP2012/000242, Jul. 2013.

* cited by examiner

GAS TURBINE EXHAUST CONE

This application is the National Phase of International Application PCT/EP2012/000242 filed Jan. 19, 2012 which designated the U.S.

This application claims priority to German Patent Application DE102011008921.7 filed Jan. 19, 2011, the entirety of which is incorporated by reference herein.

This invention relates to a gas-turbine exhaust cone arranged at the outflow area of a gas turbine.

Gas turbines for aircraft engines require noise abatement. For this purpose, various measures are known to minimize the noise of the gas stream exiting from an exhaust nozzle downstream of the turbine.

From the state of the art it is known to dampen the low frequencies occurring in particular on engines with lean combustion. Noise dampening is here accomplished by means of a Helmholtz resonator and λ/4 principle. It is known to provide such a Helmholtz resonator in the inflow area of the exhaust cone, while the downstream end area of the exhaust cone is merely conceived as geometric body. Known Helmholtz resonators are here provided as a system of radial walls and inner cylindrical ducts and dimensioned in dependence of the required frequencies.

The known designs disadvantageously require reinforcing elements as they are heavily mechanically loaded in terms of the gas temperatures occurring. Also attributable to different walls and stiffening elements, the resultant design features a relatively high weight. Additionally, manufacture thereof requires high effort and investment. Manufacturing costs are still further increased by internal acoustic measures (perforations or similar). Further, the axial length of such a resonator requires considerable installation space, adding to the weight of the arrangement.

The designs known from the state of the art have, in the front part of the gas-turbine exhaust cone, a rigid structure operating to the Helmholtz resonator principle (the terms "front" and "rear" each relate to the direction of flow through the gas turbine). A design of this type is shown for example by US 2010/0012423 A1, where rigid walls are provided; this has the disadvantage that firstly dampening is poor and secondly the overall structure is complicated and expensive to manufacture. A further disadvantage is that considerable cracking risks exist due to the thermal expansions.

A similar design is shown by US 2007/0272477 A1. Here too, rigid radial and axial partition walls are provided that delimit individual chambers. The overall structure is very complex to manufacture and also prone to thermal stress cracking.

In a broad aspect, the present invention provides a gas-turbine exhaust cone of the type specified at the beginning which, while being simply designed and having a high dampening effect, can be manufactured cost-effectively and is characterized by low weight.

It is a particular object of the present invention to provide solution to the above problems by a combination of the features described herein. Further advantageous embodiments of the present invention will become apparent from the present description.

In accordance with the invention, therefore, it is provided that the gas-turbine exhaust cone includes an outer wall and an inner wall which extend substantially parallel to one another and between which a honeycomb-structured layer is arranged. This honeycomb-structured layer is used in particular for absorption or dampening of high frequency noises.

It is furthermore provided in accordance with the invention that at least one annular chamber is provided radially inside the inner wall and is centered relative to a central axis of the gas-turbine exhaust cone, said axis being identical to the engine axis of the gas turbine.

The gas-turbine exhaust cone in accordance with the invention characterized by a variety of considerable advantages. In the state of the art, a plurality of partition walls is provided, each partition wall having different operating temperatures and hence leading to a considerable strain on the material. For this reason, the previously known structures are designed with very thick walls. In contrast to this, at least one annular chamber is formed in accordance with the invention, the walls of which can be elastically mounted, since the walls of the annular chamber do not have to transmit forces. The stability of the over structure is not the result of the partition walls of the annular chambers.

A further advantage of the design in accordance with the invention is that the honeycomb-structured layer can extend along the entire outer wall of the gas-turbine exhaust cone, so that a high degree of sound absorption is achieved.

A "honeycomb structure" must be understood in the meaning of the invention as a structure in which the honeycombs do not necessarily have to be of hexagonal cross-section, but can also be round. What is crucial is that the adjacent volumes of the honeycombs are offset relative to one another to achieve the densest possible packing.

With the at least one annular chamber provided in accordance with the invention, it is possible to selectively achieve sound dampening or sound absorption of lower frequencies. The volumes and lengths of the individual annular chambers can be optimized accordingly. The result in accordance with the invention is therefore a lightweight and compact design of the gas-turbine exhaust cone or of the acoustic absorber.

It is particularly favourable in accordance with the invention when several annular chambers are provided and each of the annular chambers has a sound inlet opening. Hence a Helmholtz resonator can be formed by the respective annular chamber, adjusted to a certain frequency range and optimized for the latter. It is therefore not necessary in accordance with the invention to provide complex axial or rotated walls, as is known from the state of the art. In accordance with the invention, this results in advantages with regard to both, the differing thermal expansion in different areas of the gas-turbine exhaust cone and the resultant sealing problems.

In a particularly favourable embodiment of the invention, it is provided that the gas-turbine exhaust cone includes a front part which is at the front in the flow direction, and an adjoining rear part, in each of which parts at least one of the annular chambers is arranged. The gas-turbine exhaust cone can thus be adjusted to the frequency ranges occurring in practice and to their assignment in the axial direction.

It is particularly favourable when several annular chambers are provided concentrically to one another and each adjoin the inner wall with at least part of their volume. These several annular chambers can be provided either in the axial direction or obliquely thereto. The result in accordance with the invention is thus a wide range of design variants permitting optimized adjustment to the respective operating conditions.

A particular advantage in accordance with the invention is that the respective annular chamber includes at least one partition wall which is elastically mounted on the gas-turbine exhaust cone. This prevents thermal stresses due to differing thermal expansions.

It is furthermore advantageous when the annular chamber is delimited by a closure wall which is preferably provided with a sound passage opening and/or with a honeycomb structure. This permits additional dampening and sound absorption.

The openings through which sound waves pass from the honeycomb-structured layer or from the outside of the gas-turbine exhaust cone into the at least one annular chamber are preferably arranged at an angle to the plane of this wall. This results in a greater length of the sound passage opening, thus improving sound dampening.

It is particularly advantageous in accordance with the invention when the annular chambers are closed off from one another and from a remaining inner volume of the gas-turbine exhaust cone.

Figure 2:
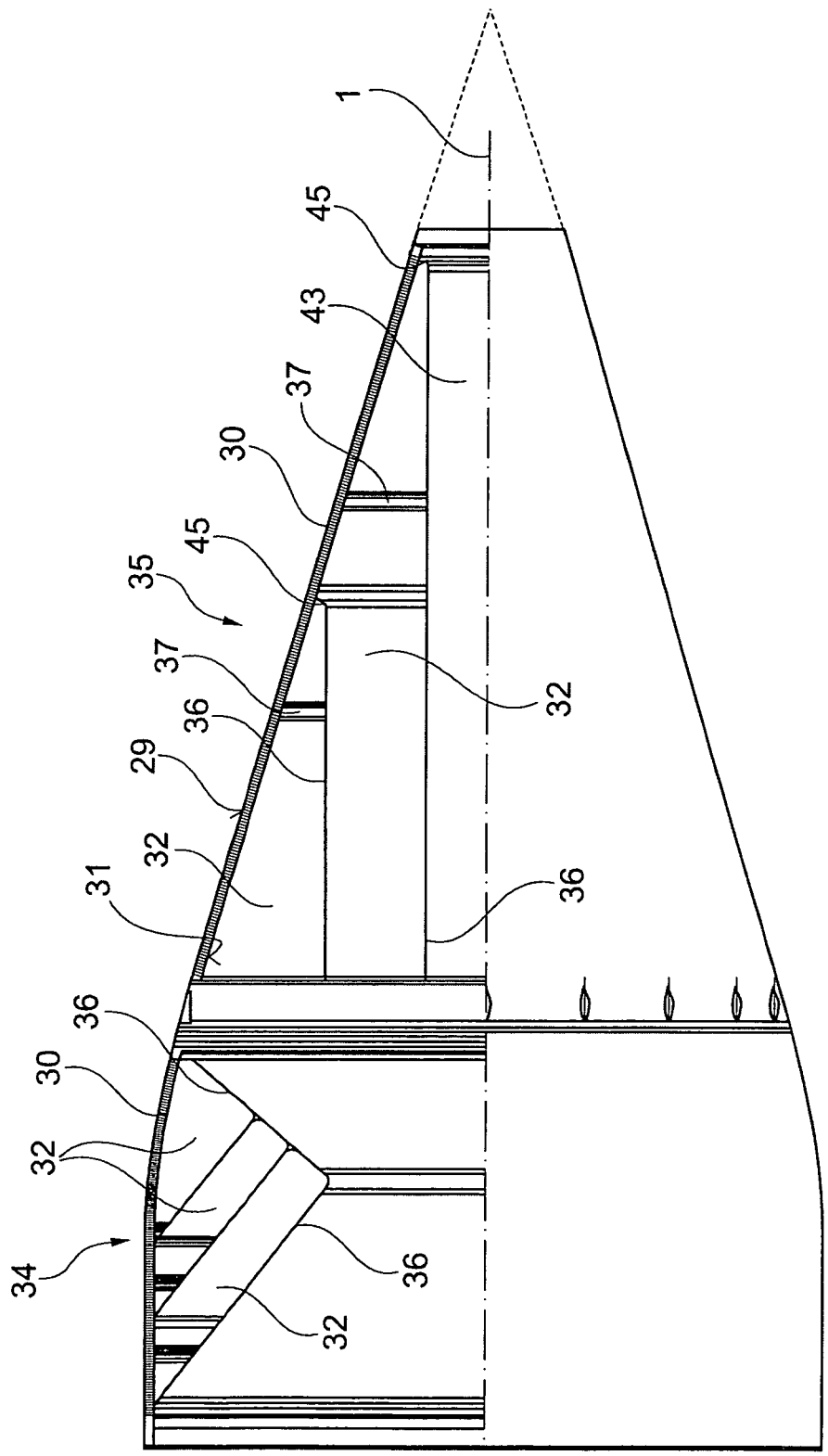
Figure 3:
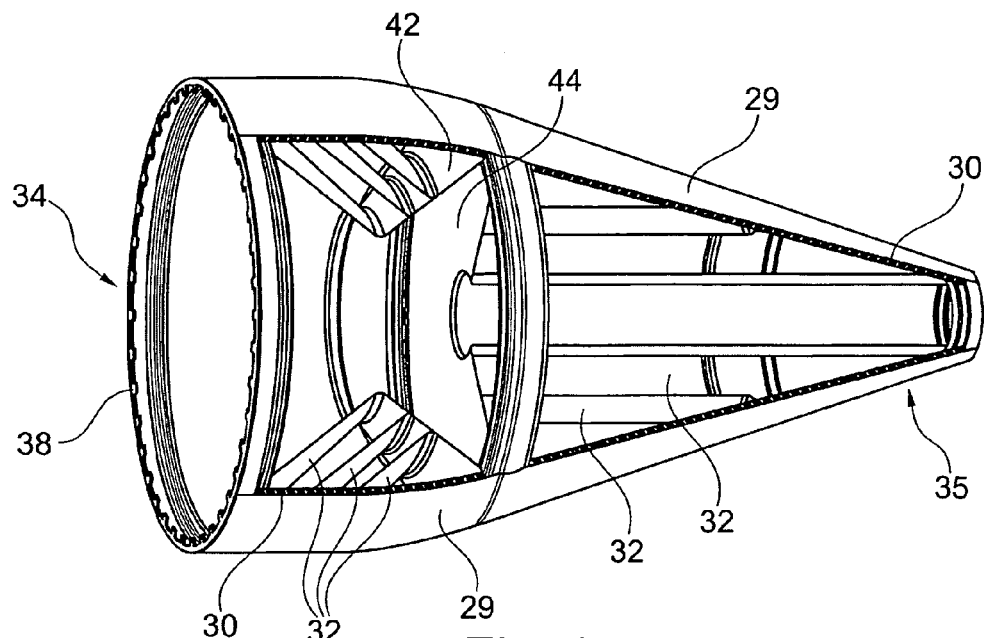
Figure 4:
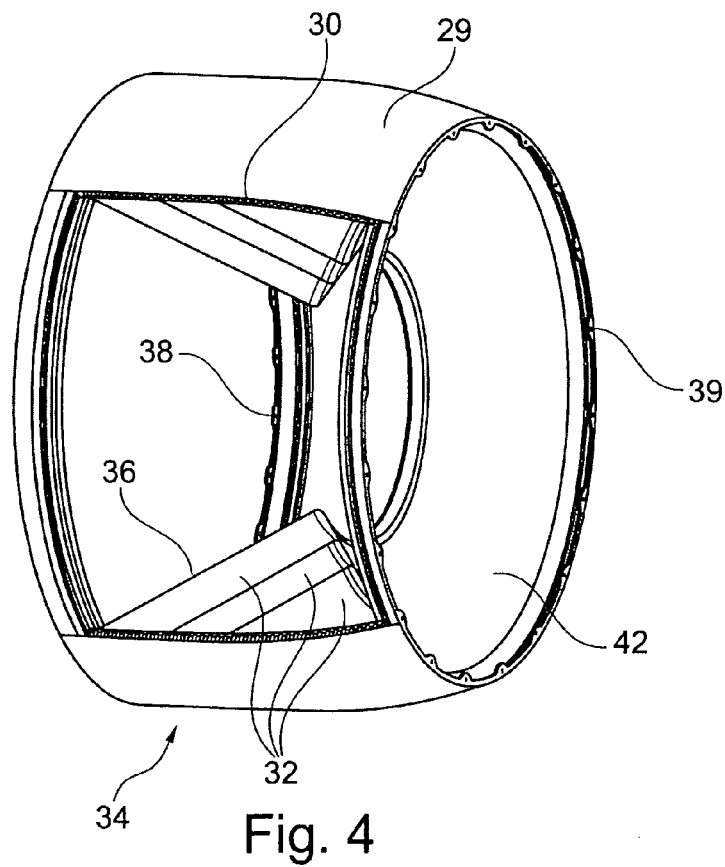
Figure 5:
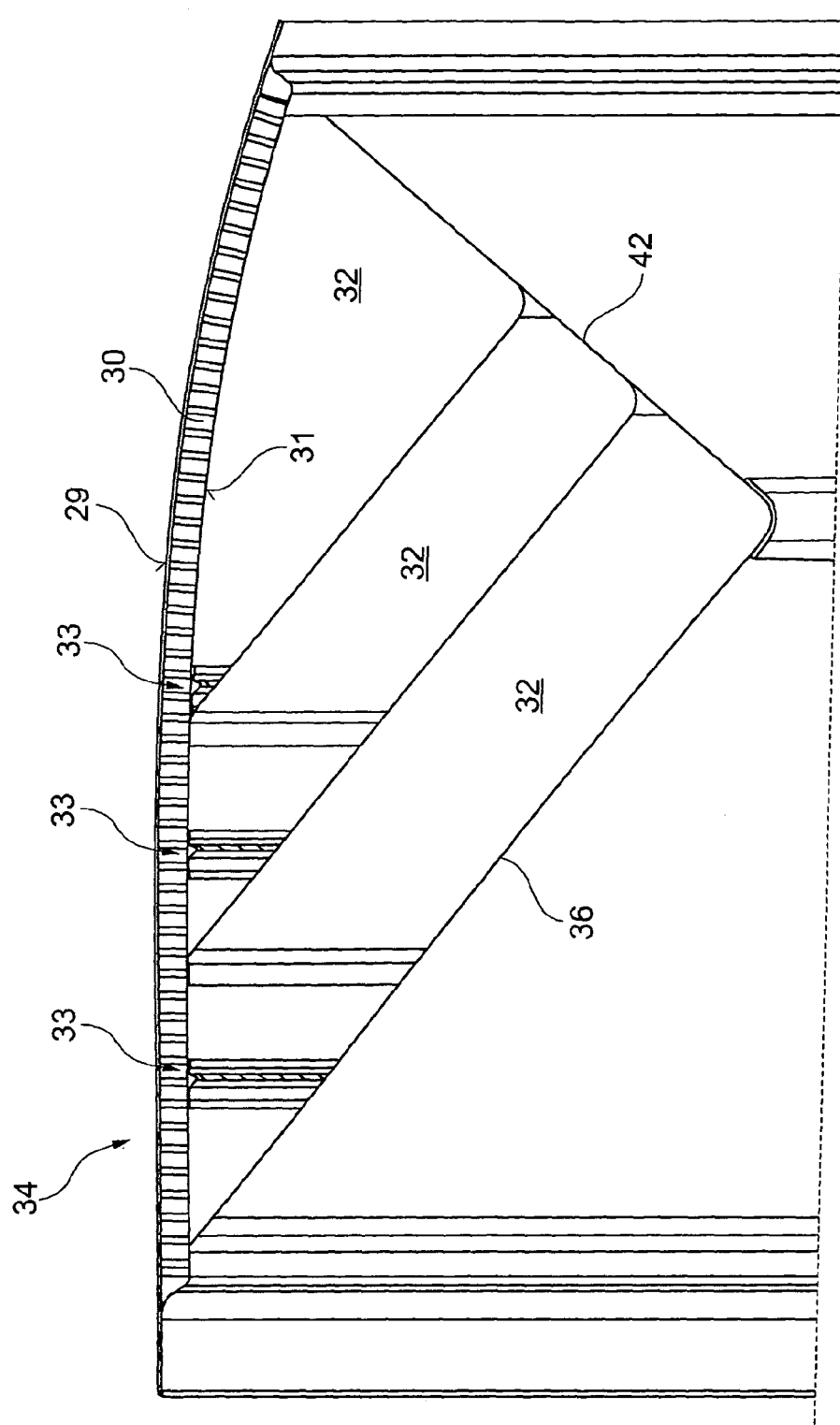
Figure 6:
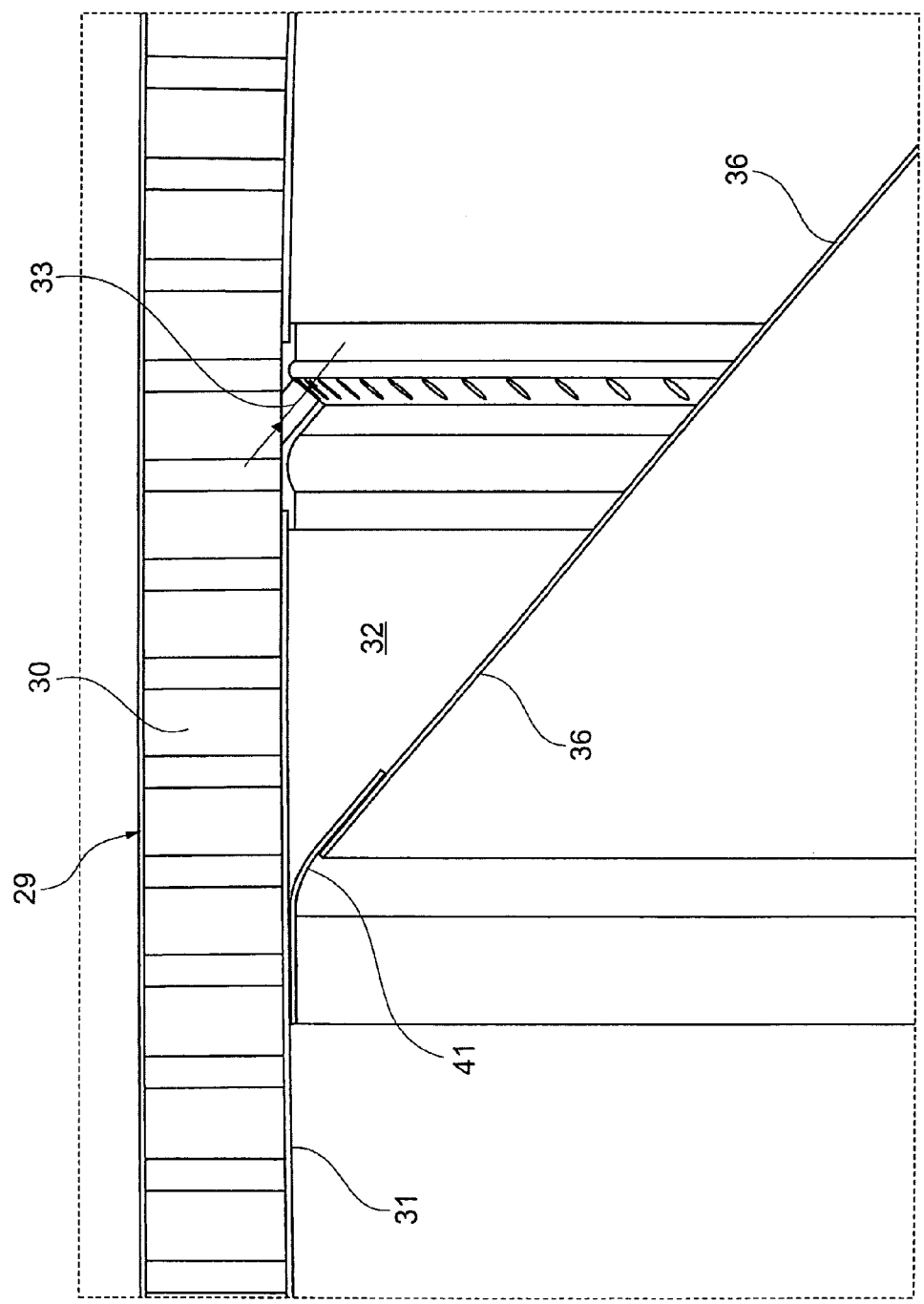
Figure 7:
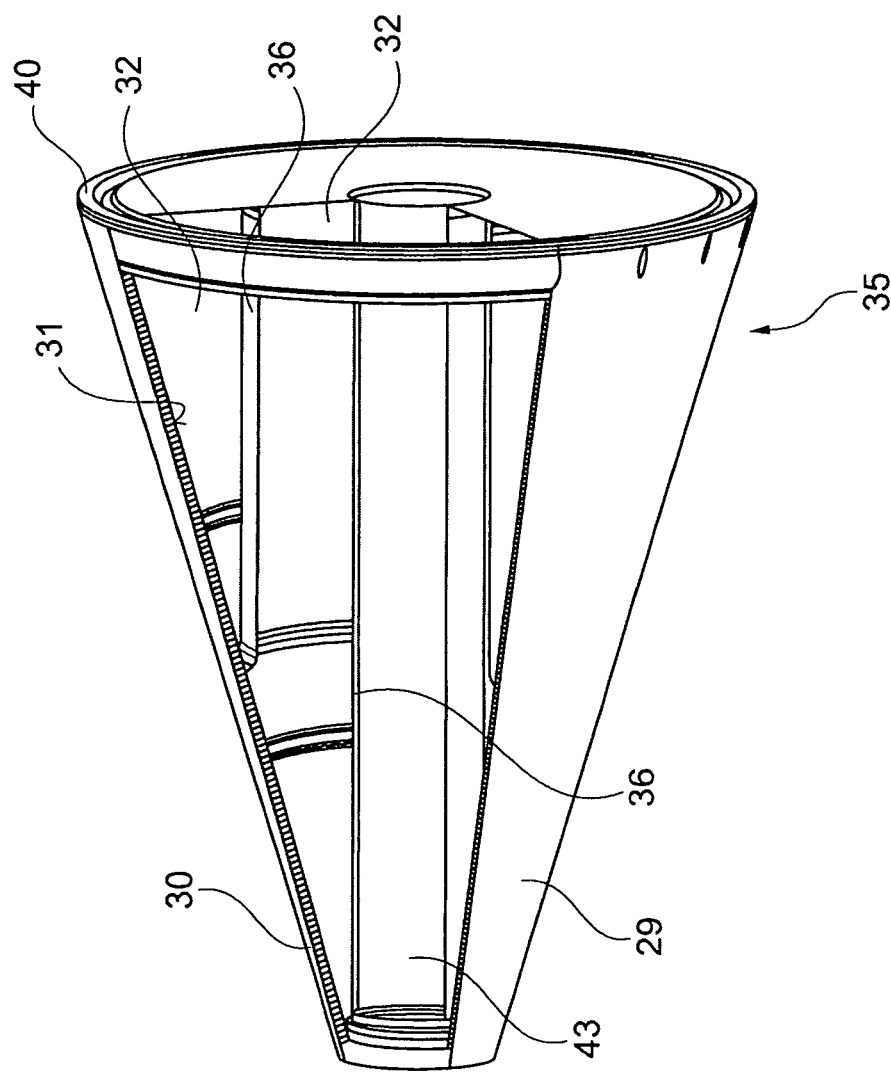

The present invention is described in the following in light of the accompanying drawing, showing exemplary embodiments. In the drawing, FIG. 1 shows a schematic representation of a gas-turbine engine in accordance with the present invention, FIG. 2 shows a simplified axial sectional view of an exemplary embodiment of the gas-turbine exhaust cone in accordance with the present invention, FIG. 3 shows perspective view, partly sectional, by analogy with FIG. 2, FIG. 4 shows a perspective partial sectional view of the front part of the gas-turbine exhaust cone shown in FIGS. 2 and 3, FIG. 5 shows an enlarged partial sectional viol of the front part, by analogy with FIG. 2, FIG. 6 shows an enlarged detail view as per FIG. 5, and FIG. 7 shows a perspective partial sectional view of the rear part of the gas-turbine exhaust cone in accordance with the present invention.

The gas-turbine engine 10 in accordance with FIG. 1 is an example of a turbomachine where the invention can be used. The following however makes clear that the invention can also be used in other turbomachines. The engine 10 is of conventional design and includes in the flow direction, one behind the other, an air inlet 11, a fan 12 rotating inside a casing, an intermediate-pressure compressor 13, a high-pressure compressor 14, combustion chambers 15, a high-pressure turbine 16, an intermediate-pressure turbine 17 and a low-pressure turbine 18 as well as an exhaust nozzle 19, all of which being arranged about a central engine axis 1.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the engine casing 21 in an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation.

FIG. 1 furthermore shows an exhaust cone with reference numeral 28

FIG. 2 shows in a schematic representation an axial section through an exemplary embodiment of a gas-turbine exhaust cone in accordance with the invention. The cone includes a front part 34 and a rear part 35. As shown in the representation in FIG. 2, the gas turbine is flown from the left to the right. The front part 34 is designed substantially cylindrical, while the rear part 35 is conical. The front part 34 is mounted in the usual way by means of a flange 38 (see for example FIGS. 3 and 4). Furthermore, the front part 34 and the rear part 35 are connected in the usual way using flanges 39 and 40 respectively (see FIGS. 4 and 7).

Both the front part 34 and the rear part 35 each have an outer wall 29, parallel to which extends an inner wall 31. A honeycomb layer 30 is provided between the walls 29 and 31, and is designed with honeycombs whose volume extends in the radial direction. The outer wall 29 is provided with a plurality of recesses (through passages), for example micro-perforations, such that sound waves can enter through the recesses (not shown in detail) of the outer wall 29 into the honeycomb layer 30 and be dampened there.

FIG. 2 furthermore shows that several annular chambers 32 are arranged radially inside the inner wall 31 and extend at an angle to the central axis 1. The annular chambers are connected via passage recesses 33 (through passages—sound inlet openings) to the honeycomb layer, as shown in an enlarged representation in FIG. 6. The passage recesses 33 are likewise arranged at an angle to the central axis 1, in order to increase the effective overall length of the passage recess 33 (through passage—sound inlet opening).

As shown by FIG. 6, a partition wall 36 (wall of annular chamber 32) is mounted on the inner wall 31 by means of an elastic bearing 41. Changes in length caused by thermal expansions are therefore not transmitted into the overall structure of the gas-turbine exhaust cone. The problems known from the state of the art with regard to crack formation, over-dimensioning or the like are completely eliminated.

FIG. 2 shows in the exemplary embodiment three annular chambers 32 concentric to one another in the front part 34. This is also shown in FIGS. 3 and 4 for greater clarity. The three annular chambers 32 are, as shown in FIG. 5, delimited by a front closure wall 42 elastically fastened to the partition walls 36.

As shown in FIGS. 2 and 7, the conical rear part 35 likewise includes two annular chambers 32 concentric to one another and connected by suitable sound inlet openings to the surroundings or to the honeycomb layer 30. A central duct 43 is provided in the center of the rear part 35 and can be used in the usual way, for example for ventilation purposes. The annular chambers can be delimited by closure walls 37 which are preferably provided with sound passage openings and/or with a honeycomb structure. This permits additional dampening and sound absorption.

FIGS. 2 and 7 show that the concentric annular chambers 32, by the manner of their design and arrangement, permit the provision of very large dampening volumes.

The result is that the annular chambers 32 arranged in the rear part 35 are mounted by means of elastic bearings 45 in respect of their partition walls 36 too, so that material stresses due to thermal expansions can be prevented. This ensures a lightweight overall structure which can be manufactured at low cost.

LIST OF REFERENCE NUMERALS

1 Engine axis/central axis
10 Gas-turbine engine
11 Air inlet
12 Fan rotating inside the casing
13 Intermediate-pressure compressor
14 High-pressure compressor
15 Combustion chambers
16 High-pressure turbine 17 Intermediate-pressure turbine
18 Low-pressure turbine
19 Exhaust nozzle
20 Guide vanes
21 Engine casing/cowling
22 Compressor rotor blades
23 Stator vanes
24 Turbine blades
25 Compressor drum or disk
26 Turbine rotor hub
27 Exhaust cone
28 Outer wall
29 Honeycomb layer
30 Inner wall
31 Annular chamber
32 Passage recess (sound inlet opening)
33 Front part
34 Rear part
35 Partition wall (wall)
36 Closure wall
37 Flange
38 Flange
39 Flange
40 Elastic bearing
41 Front closure wall
42 Central duct
43 Closure wall
44 Elastic bearing

What is claimed is:

1. A gas-turbine exhaust cone comprising:
an outer wall, which is provided with a plurality of through passages,
a honeycomb-structured layer arranged on an inside of the outer wall and extending along the inside of the outer wall,
an inner wall extending substantially parallel to the outer wall and connected to the honeycomb-structured layer, and
a plurality of annular chambers adjoining the inner wall and centered relative to a central axis of the exhaust cone, wherein the inner wall includes a plurality of second through passages connecting the honeycomb-structured layer to the plurality of annular chambers;
wherein the gas-turbine exhaust cone includes a front part which is at a front in a flow direction, an adjoining rear part, and a first portion of the plurality of annular chambers is arranged in the front part;
wherein the first portion of the plurality of annular chambers arranged in the front part are bounded by frustoconical shaped partition walls extending inwardly from the inner wall at an oblique angle to a central axis of the gas-turbine exhaust cone, the frustoconical shaped partition walls arranged concentrically on the central axis and radially overlapping each other.

2. The gas-turbine exhaust cone in accordance with claim 1, wherein at least one of the plurality of annular chambers includes at least one partition wall which is elastically mounted on the gas-turbine exhaust cone.

3. The gas-turbine exhaust cone in accordance with claim 1, wherein the rear part includes a second portion of the plurality of annular chambers arranged concentrically to the central axis, radially overlapping one another and extending in an axial direction parallel to the central axis.

4. The gas-turbine exhaust cone in accordance with claim 3, and further comprising a closure wall delimiting one of the second portion of the plurality of annular chambers.

5. The gas-turbine exhaust cone in accordance with claim 1, wherein the second through passages are arranged at an angle to a plane of the inner wall.

6. The gas-turbine exhaust cone in accordance with claim 1, wherein the plurality of annular chambers are closed off from one another and from a remaining inner volume of the gas-turbine exhaust cone.

7. The gas-turbine exhaust cone in accordance with claim 1, wherein walls of the honeycomb-structured layer are arranged substantially radially to the central axis.

8. The gas-turbine exhaust cone in accordance with claim 4, wherein the plurality of annular chambers are closed off from one another and from a remaining inner volume of the gas-turbine exhaust cone.

9. The gas-turbine exhaust cone in accordance with claim 8, wherein the first portion of the plurality of annular chambers includes three annular chambers all radially overlapping each other.

10. The gas-turbine exhaust cone in accordance with claim 9, wherein the three annular chambers all axially overlap each other.

11. The gas-turbine exhaust cone in accordance with claim 8, wherein the first portion of the plurality of annular chambers includes three annular chambers all radially overlapping each other.

12. The gas-turbine exhaust cone in accordance with claim 11, wherein the three annular chambers all axially overlap each other.

\* \* \* \* \*